Patented June 9, 1925.

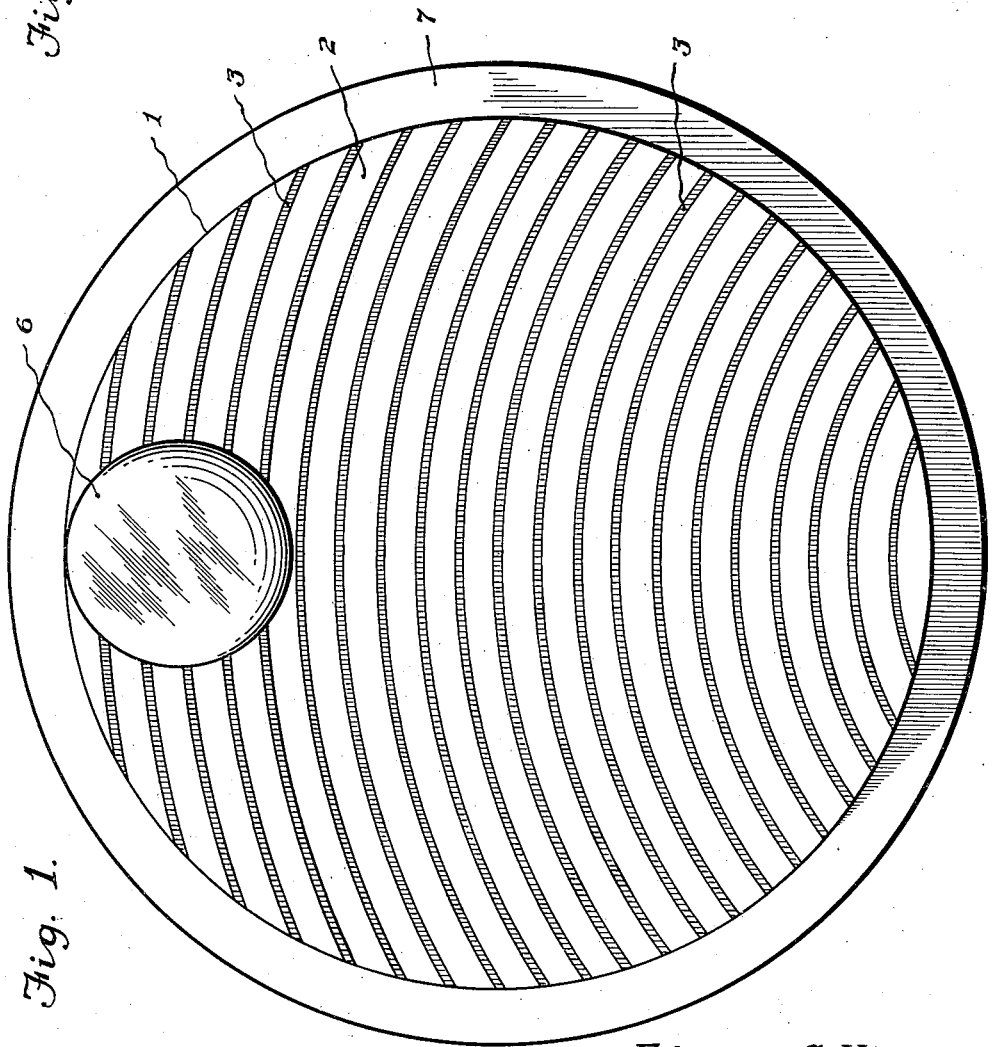

1,541,706

UNITED STATES PATENT OFFICE.

EDWARD GEORGE HAMBURG, OF PHILADELPHIA, PENNSYLVANIA.

HEADLIGHT LENS.

Application filed December 26, 1924. Serial No. 758,234.

*To all whom it may concern:*

Be it known that I, EDWARD G. HAMBURG, a citizen of the United States, residing at Philadelphia, in the county of Philadelphia and State of Pennsylvania, have invented new and useful Improvements in Headlight Lenses, of which the following is a specification.

This invention relates to lenses for vehicle headlights, and an object of the invention is to provide a lens which will prevent the blinding glare in the eyes of approaching motors or pedestrians, and which will also permit of thorough and efficient illumination of the road surface in front of the vehicle equipped with the lens.

A further object of the invention is to provide a lens as specified, which includes the major lens of a predetermined color, preferably clear, and which has a relatively small eccentrically disposed portion thereof, of a distinctly different color than the major portion of the lens.

Other objects of the invention will appear in the following detail description and in the accompanying drawings wherein:

Figure 1 is a front elevation of the improved lens.

Figure 2 is a vertical section through the lens taken on the line 2—2 of Figure 1.

Referring more particularly to the drawings, the improved lens comprises the main body 1 of the lens, which is composed of a plurality of alternate arcuate transparent sections 2 and alternate arcuate opaque sections 3. The sections 2 and 3 are all scribed from a common center and have their convex surfaces upwardly, as clearly shown in Figure 1 of the drawings, for the purpose of guiding and concentrating the light rays to provide proper and efficient illumination of the road surface in front of the vehicle without causing a glare in the eyes of an approaching motorist. The sections 2 and 3 incline transversely, inclining downwardly from the rear face of the lens to the front face, so that the opaque sections 3 will form an obstruction for preventing the upward directing of the light rays from the lamp behind the lens. The front sides of the transparent sections 2 are substantially semi-egg-shaped in cross-section, that is, they are scribed on arcs of a short and long radius with the arc scribed on the short radius on the upward edge, while the arc scribed on the long radius faces forwardly and downwardly, as clearly shown in Figure 2 of the drawings.

A lens 6 is formed or placed in the main lens body 1 eccentrically thereof and preferably at the top and center of the lens 1. This lens 6 is transparent and is preferably of a color distinctly different and in distinct contrast to the color of the sections 2 of the lens 1. That is it may be red, green, blue or any desired color, while the sections 2 are preferably clear glass.

The entire lens body 1 is surrounded by a rim 7 of clear glass, which is preferably thinner than the lens 1 and is provided to facilitate attachment of the lens to a lamp casing.

It is, of course, to be understood, that the invention may be constructed in various other manners and the parts associated in different relations, and therefore, I do not desire to be limited in any manner, except as set forth in the claims hereunto appended.

What I claim is:—

1. A lens comprising a plurality of transversely extending arcuate sections, the alternate sections being transparent and the sections between the alternate sections being opaque, all of said transverse sections being scribed from a common center and with their convex surfaces facing upwardly, said transparent and opaque sections inclining downwardly from the rear face of the lens to the front face thereof.

2. A lens comprising a plurality of transversely extending arcuate sections, the alternate sections being transparent and the sections between the alternate sections being opaque, all of said transverse sections being scribed from a common center and with their convex edges facing upwardly, said transparent and opaque sections inclining downwardly from the rear face of the lens to the front face thereof, said transparent sections having their forward faces formed substantially semi-egg-shaped in cross section.

3. A lens comprising a plurality of transversely extending arcuate sections, the alternate sections being transparent and the sections between the alternate sections being opaque, all of said transverse sections being scribed from a common center and with their convex edges facing upwardly, said transparent and opaque sections inclining downwardly from the rear face of the lens to the front face thereof, said transparent sections having their forward faces formed substantially semi-egg-shaped in cross section, and a clear relatively small lens carried within the said first named lens eccentrically thereof.

4. A lens comprising a plurality of transversely extending arcuate sections, the alternate sections being transparent and the sections between the alternate sections being opaque, and a relatively small eccentrically disposed lens in said first named lens, and of a color in direct contrast to the color of the first named lens.

In testimony whereof I affix my signature.

EDWARD GEORGE HAMBURG.